US011231540B2

(12) United States Patent
Calafiore

(10) Patent No.: US 11,231,540 B2
(45) Date of Patent: Jan. 25, 2022

(54) ANISOTROPICALLY FORMED DIFFRACTION GRATING DEVICE

(71) Applicant: Facebook Technologies, LLC, Menlo Park, CA (US)

(72) Inventor: Giuseppe Calafiore, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/877,937

(22) Filed: May 19, 2020

(65) Prior Publication Data

US 2020/0278487 A1 Sep. 3, 2020

Related U.S. Application Data

(62) Division of application No. 16/197,054, filed on Nov. 20, 2018, now Pat. No. 10,690,831.

(51) Int. Cl.
*F21V 8/00* (2006.01)
*G02B 5/18* (2006.01)
*G02B 27/01* (2006.01)

(52) U.S. Cl.
CPC ......... *G02B 6/0046* (2013.01); *G02B 5/1819* (2013.01); *G02B 27/0172* (2013.01); *G02B 2027/0178* (2013.01)

(58) Field of Classification Search
None
See application file for complete search history.

(56) References Cited

U.S. PATENT DOCUMENTS

| 5,080,465 | A | 1/1992 | Laude |
| 6,449,096 | B1 | 9/2002 | Fabiny et al. |
| 7,349,599 | B1 | 3/2008 | Iazikov et al. |
| 8,035,895 | B2 | 10/2011 | Taira et al. |
| 8,774,247 | B2 | 7/2014 | Sukegawa et al. |
| 2001/0003035 | A1 | 6/2001 | Ozarski et al. |
| 2001/0050815 | A1 | 12/2001 | Ishihara et al. |
| 2002/0001672 | A1 | 1/2002 | Pan et al. |

(Continued)

FOREIGN PATENT DOCUMENTS

WO 2012124809 9/2012

OTHER PUBLICATIONS

International Preliminary Report on Patentability for International Application No. PCT/US2018/062307, dated Jun. 3, 2021, 10 Pages.

(Continued)

*Primary Examiner* — Tina M Wong
(74) *Attorney, Agent, or Firm* — Pequignot + Myers; Matthew A. Pequignot

(57) ABSTRACT

A diffraction grating includes a substrate and an array of triangular ridges extending from the substrate. The ridges run parallel to one another and have triangular cross-sections such that first sides of the ridges face in a first direction and adjacent second sides of the ridges face in a second, different direction. An array of grating lines is disposed over the first sides of the array of ridges, each grating line of the array of grating lines comprising a slab of transparent material supported by the first side of a corresponding ridge of the array of ridges. A refractive index of the array of grating lines is different from a refractive index of the array of ridges.

15 Claims, 10 Drawing Sheets

(56) References Cited

U.S. PATENT DOCUMENTS

| | | |
|---|---|---|
| 2002/0196546 A1 | 12/2002 | Fabiny |
| 2003/0161044 A1 | 8/2003 | Tokoyoda |
| 2004/0156108 A1* | 8/2004 | Chou ............... G03F 7/0002 359/566 |
| 2005/0078374 A1 | 4/2005 | Taira et al. |
| 2009/0027776 A1 | 1/2009 | Schall et al. |
| 2009/0263631 A1* | 10/2009 | Sakamoto ........ H01L 21/0273 428/195.1 |
| 2009/0273834 A1 | 11/2009 | Korenaga |
| 2010/0120493 A1 | 5/2010 | Hoffman et al. |
| 2010/0226014 A1 | 9/2010 | Taira et al. |
| 2012/0120493 A1 | 5/2012 | Simmonds et al. |
| 2012/0229904 A1 | 9/2012 | Kitamura et al. |
| 2012/0257490 A1 | 10/2012 | Zhou |
| 2012/0299138 A1 | 11/2012 | Rauker et al. |
| 2013/0247494 A1* | 9/2013 | Schrunk ............... E04F 15/02 52/390 |
| 2015/0349479 A1 | 12/2015 | Oue et al. |
| 2015/0355394 A1 | 12/2015 | Valera et al. |
| 2016/0035539 A1 | 2/2016 | Sainiemi et al. |
| 2016/0259098 A1 | 9/2016 | Sasai |
| 2017/0307887 A1 | 10/2017 | Stenberg et al. |
| 2018/0217305 A1 | 8/2018 | Valera |
| 2019/0056591 A1 | 2/2019 | Tervo et al. |
| 2019/0129089 A1 | 5/2019 | Mohanty |
| 2019/0293856 A1 | 9/2019 | Danziger |

OTHER PUBLICATIONS

International Search Report and Written Opinion for International Application No. PCT/US2018/062307, dated Aug. 8, 2019, 11 Pages.

* cited by examiner

ANISOTROPICALLY FORMED DIFFRACTION GRATING DEVICE

REFERENCE TO RELATED APPLICATION

The present invention is a divisional of U.S. patent application Ser. No. 16/197,054 filed on Nov. 20, 2018 and incorporated herein by reference in its entirety.

TECHNICAL FIELD

The present disclosure relates to visual displays and display systems, and in particular to optical components and modules for wearable displays, and related methods of manufacturing.

BACKGROUND

Head-mounted displays (HMDs), near-eye displays (NEDs), and other wearable display systems can be used to present virtual scenery to a user, or to augment real scenery with dynamic information, data, or virtual objects. The virtual or augmented scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Lightweight and compact near-eye displays reduce strain on the user's head and neck, and are generally more comfortable to wear. The optics block of such displays can be the heaviest part of the entire system. Compact planar optical components, such as waveguides, gratings, Fresnel lenses, etc., may be employed to reduce size and weight of an optics block. However, compact planar optics may have limitations related to image quality, exit pupil size and uniformity, pupil swim, field of view of the generated imagery, visual artifacts, etc.

BRIEF DESCRIPTION OF THE DRAWINGS

Exemplary embodiments will now be described in conjunction with the drawings, in which.

DETAILED DESCRIPTION

Figure 1:
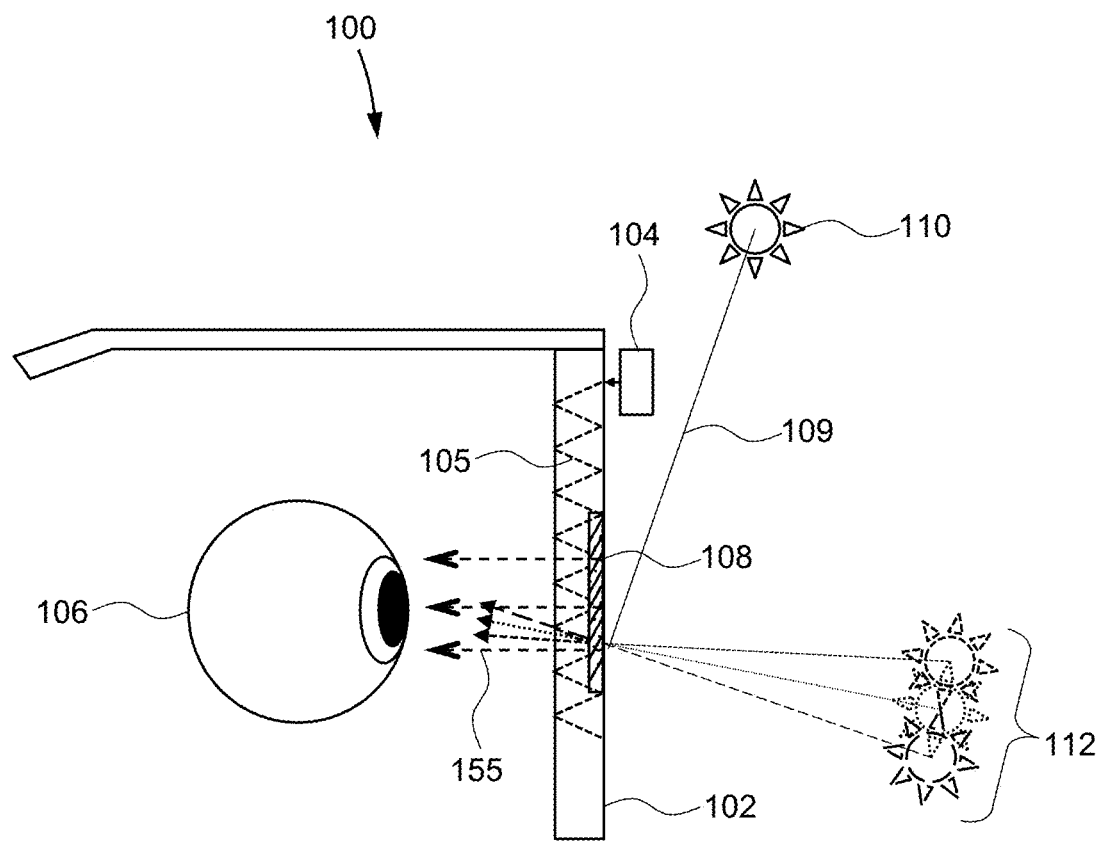
FIG. 1 is a side cross-sectional view of a near-eye display of the present disclosure showing possible rainbow light paths.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 3A to 3E, 4A, 4B, and FIG. 6, similar reference numerals refer to similar elements.

Diffraction gratings are used in pupil-replicating waveguides to output an optical beam carrying an image to be displayed. The diffraction gratings are known to sometimes diffract light from a bright source, such as the sun, towards a user's eye. This deleterious effect is called rainbow effect, because the diffracted light appears colored due to angular dispersion of the external light by the diffraction grating. Surface relief diffraction gratings may be adapted to reduce the rainbow effect. However, required duty cycles of the adapted diffraction gratings may be too small or too large to manufacture them with high yield.

In accordance with the present disclosure, there is provided a method of manufacturing a diffraction grating, the method comprising forming an array of ridges extending from a substrate, the ridges running parallel to one another and having triangular cross-sections, such that first sides of the ridges face in a first direction and adjacent second sides of the ridges face in a second, different direction. The method further includes forming an array of grating lines over the first sides of the array of ridges, each grating line of the array of grating lines comprising a slab of transparent material supported by the first side of a corresponding ridge of the array of ridges. A refractive index of the array of grating lines is different from a refractive index of the array of ridges. The method may further include forming an overcoat layer over the array of grating lines, the overcoat layer having a substantially flat top surface opposite the substrate. In some embodiments, the overcoat layer is formed of a same material as the array of ridges.

The array of grating lines may be formed such that no grating lines are present on the second sides of the ridges, e.g. using a directional deposition of a grating layer material over the first sides of the array of ridges, or using isotropic deposition of a grating layer material over the first and second sides of the ridges, followed by an anisotropic etching of the grating layer material from the second sides of the ridges. In some embodiments, the method further includes selectively removing at least a portion of the transparent material of the array of grating lines in a space-variant manner to produce the array of grating lines having a spatially variant duty cycle. The array of grating lines having a spatially variant duty cycle may also be formed by space-variant directional deposition of the transparent material onto the first sides of the ridges.

In accordance with the present disclosure, there is further provided a diffraction grating including a substrate and an array of ridges extending from the substrate. The ridges are running parallel to one another in a plane parallel to a plane of the substrate and having triangular cross-sections, such that first sides of the ridges face in a first direction and adjacent second sides of the ridges face in a second, different direction. An array of grating lines has a different refractive index than the array of ridges, each grating line of the array of grating lines comprising a slab of transparent material supported by the first side of a corresponding ridge of the array of ridges. In some embodiments, no grating lines are present on the second sides of the ridges.

At least one of the substrate or the array of ridges may include a different material than the array of grating lines. The array of grating lines may have a spatially variant duty cycle. An overcoat layer may be provided over the array of grating lines, the overcoat layer having a substantially flat top surface. A difference between a refractive index of the overcoat layer and a refractive index of the array of ridges may be less than 0.05. The overcoat layer and the array of ridges may be made of a same material, thereby forming a transparent matrix supporting the array of grating lines over the substrate, such that each grating line is disposed at an angle to the substrate.

In some embodiments, vertical projections of neighboring grating lines of the array of grating lines onto the substrate overlap each other. In some embodiments, each grating line slab of the array of grating lines covers only a portion of a corresponding first side of the array of ridges. The array of grating lines may have a high or a low duty cycle, e.g. between 0.01 and 0.3, or between 0.7 and 0.99.

In accordance with the present disclosure, there is further provided a pupil-replicating waveguide comprising a substrate and an array of ridges extending from the substrate. The ridges run parallel to one another in a plane parallel to a plane of the substrate and have triangular cross-sections, such that first sides of the ridges face in a first direction and adjacent second sides of the ridges face in a second, different direction. The pupil-replicating waveguide further includes an array of grating lines of a different material than the array of ridges, each grating line of the array of grating lines comprising a slab of transparent material supported by the first side of a corresponding ridge of the array of ridges, and an overcoat layer over the array of grating lines, the overcoat layer having a substantially flat top surface. The substrate includes opposed first and second surfaces, wherein the array of ridges extends from the first surface, and wherein the substrate is configured to guide display light by total internal refection from the second surface and the top surface of the overcoat layer. At least one of pitch, duty cycle, height, slant angle, or refractive index of the array of grating lines is selected to output portions of the display light at a plurality of offset locations along an optical path of the display light. The at least one of the pitch, the duty cycle, the height, the slant angle, or the refractive index of the array of grating lines may also be selected to lessen non-zero-order diffraction of non-display external light to an eyebox of the pupil-replicating waveguide.

Referring now to FIG. 1, a near-eye display (NED) 100 of the present disclosure has a form factor of eyeglasses. The NED 100 includes a pupil-replicating waveguide 102 and a light source 104, e.g. a projection display, optically coupled to the pupil-replicating waveguide 102 to provide display light 105 carrying an image to be displayed to a user's eye 106. The display light 105 propagates in the pupil-replicating waveguide 102 by total internal reflection (TIR) in a zigzag pattern, as illustrated with dashed lines. The pupil-replicating waveguide 102 includes a diffraction grating 108 for out-coupling the display light 105 to the user's eye 106 at a plurality of locations, thereby expanding ("replicating") output pupil of the NED 100 for comfort of observation and compatibility with multiple users. Long-dash arrows 155 show the out-coupled beams propagating towards the user's eye 106. Sunlight 109 from the sun 110 impinges onto the diffraction grating 108 and is diffracted by the diffraction grating 108 providing a rainbow 112, i.e. a plurality of overlapped offset colored images of the sun 110. The rainbow 112 can be quite distracting to the viewer due to its vivid colors; furthermore, the rainbow 112 may move along the field of view in response to movement or reorientation of the viewer's head.

Figure 2:
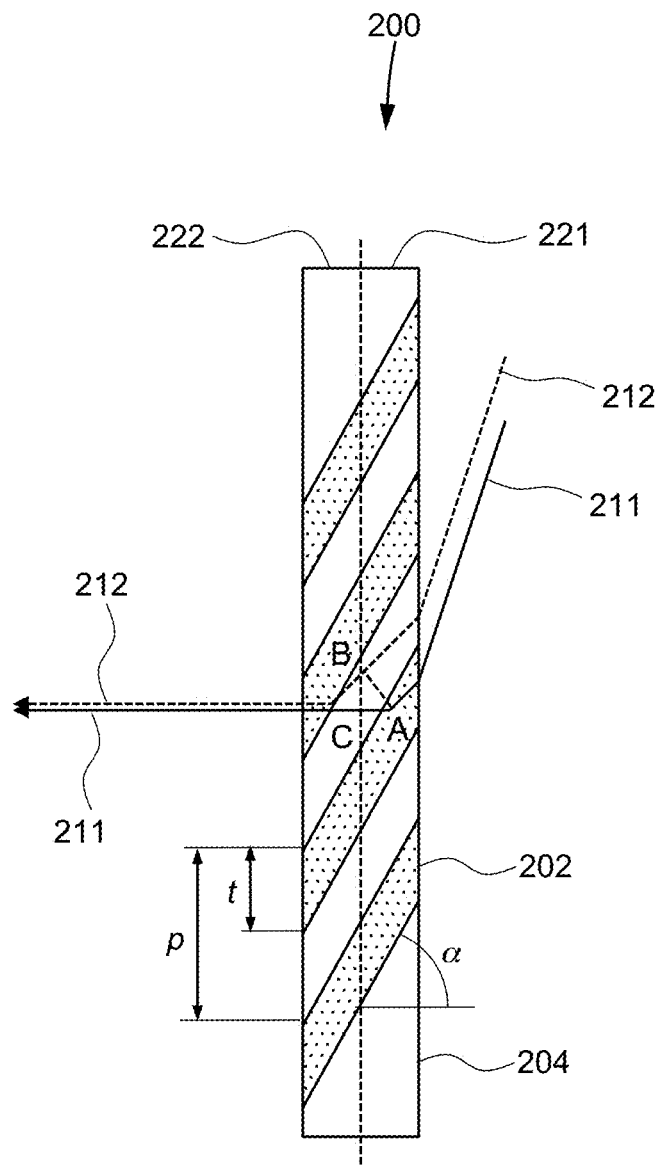
FIG. 2 is a side cross-sectional view of a diffraction grating with rainbow suppression.

Referring to FIG. 2, a diffraction grating 200 may be used in place of the diffraction grating 108 of the pupil-replicating waveguide 102 of FIG. 1. The diffraction grating 200 is configured to mitigate the rainbow effect, among other things. The diffraction grating 200 includes grating lines 202 suspended in a substantially transparent substrate 204. The grating lines 202 are thin slabs of transparent material. The grating lines 202 are spaced apart at a pitch p and tilted at an angle α relative to a normal 206 of the substrate 204. The grating lines 202 have a thickness t along the length of the substrate 204, as shown. The grating lines 202 may be made of a different material than the substrate 204 and may have a different refractive index than the substrate 204. An duty cycle k of the diffraction grating 200 is defined as k=t/p. The duty cycle k may vary from 0 to 1.

In accordance with the present disclosure, the refractive indices of the grating lines 202 and the substrate 204, the tilt angle α, the thickness t, and/or the duty cycle k of the grating lines 202 may be selected to reduce or suppress the rainbow effect by modeling the rainbow effect and adjusting the above parameters to reduce the optical power of the rainbow beams while optimizing the pupil-replication function of the diffraction grating 200. To model the rainbow effect, one may e.g. trace first 211 and second 212 rays having a same ray angle and originating from a same source such as the sun. The first ray 211, shown with solid lines, is diffracted at a point A located at an upper half 221 of the diffraction grating 200. The second ray 212, shown with dashed lines, is diffracted at a point B located at a lower half 222 of the diffraction grating 200. Both rays 211 and 212 are combined at a point C and then co-propagate to the left in FIG. 2. Accordingly, the distance AC represents the optical path difference between the first 211 and second 212 rays. In accordance with the present disclosure, the refractive index, thickness t, tilt angle α, and/or the duty cycle k of the grating lines 202 may be selected such that the distance AC is approximately equal to an odd number of half-wavelengths of the first 211 and second 212 rays. At the distance AC equal to an odd number of half-wavelengths, a destructive interference of light waves corresponding to the first 211 and second 212 rays results, effectively suppressing the rainbow formation from the direction of the first 211 and second 212 rays. More than two rays may need to be traced at a multitude of wavelengths and incidence angles, to suppress rainbow effects at these wavelengths and incidence angles. The first 211 and second 212 rays are only shown by way of illustration.

The diffraction grating 200 may be manufactured using various techniques, such as slanted etching and/or imprint. In a slanted etching process, a layer of a grating material, such as $Si_3N_4$, $SiO_2$, silicon oxynitride or siliconoxycarbonitride, $HfO_2$, TiO2, a thin-layer stack of these materials or optically equivalent options, on a transparent substrate is masked e.g. with a photoresist material, a metal (e.g., copper, chrome, aluminum, or molybdenum), an intermetallic compound (e.g., $MoSi_2$), or a polymer. Mask layer 1930 may be formed by, for example, a lithography process. The mask is patterned with a desired grating pattern and a slanted etching process, such as a dry etching process e.g., reactive ion etching (RIE), inductively coupled plasma (ICP), deep silicon etching (DSE), or ion beam etching (IBE), is applied. The mask is then removed. In an imprint process, a mold is first prepared using e.g. the slanted etching process, and the mold is imprinted in a layer of curable resin on a substrate. The mold is then removed e.g. in a demolding process.

Both slanted etching and molding processes only work reasonably well, i.e. with a high enough yield, within a certain range of duty cycles k, typically between 0.3 and 0.7. Meanwhile, the optimization of diffraction gratings to suppress rainbow effects while maintaining the pupil-replicating function, may require the duty cycles less than 0.3, e.g. 0.01 to 0.3, and greater than 0.7, e.g. 0.7 to 0.99. The manufacturing of diffraction gratings for pupil-replicating waveguides with very high or very low duty cycles becomes unfeasible using solely slanted etching or imprint methods.

In accordance with the present disclosure, the diffraction grating 200 may be manufactured using anisotropic processes such as directional material deposition and/or directional material removal. The manufacturing process described below has an advantage of a broader range of achievable duty cycles k.

Figure 3A:
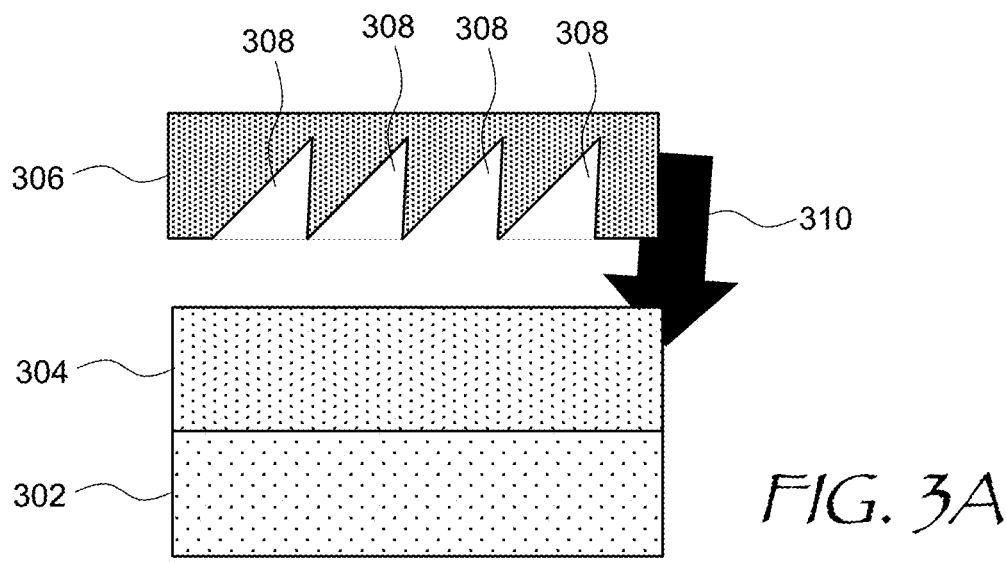
FIGS. 3A to 3E are schematic side cross-sectional views of a diffraction grating of the present disclosure at different stages of manufacture.
Figure 3B:
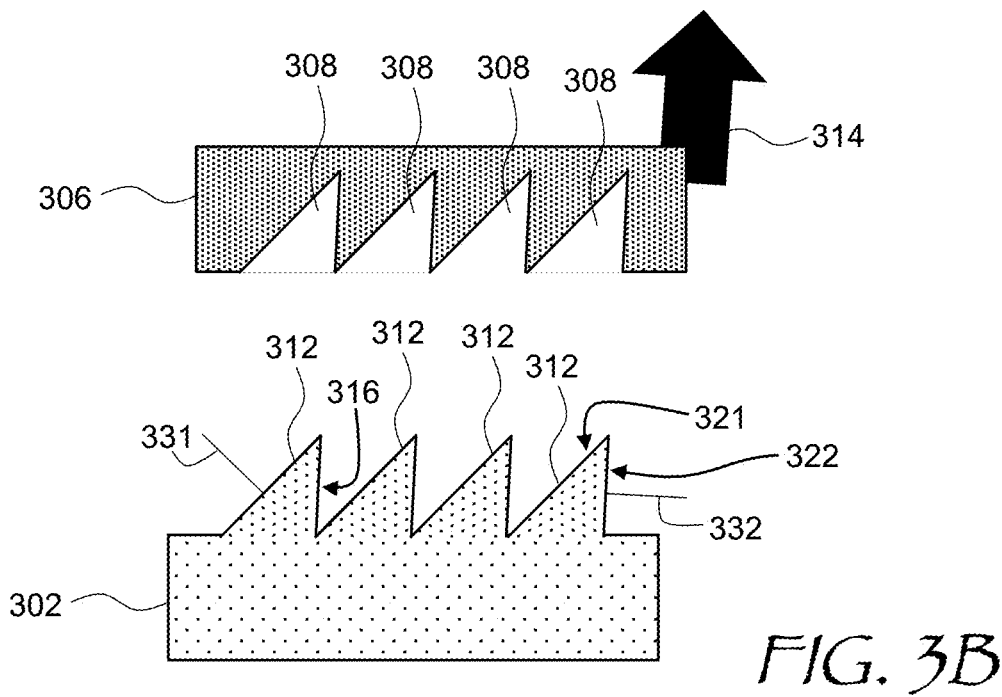

Referring to FIGS. 3A and 3B, a substrate 302 may be coated with a nanoimprint lithography (NIL) resin layer 304. The NIL resin layer 304 may include, for example, a butyl-acrylate based resin doped with a resin comprising a sol-gel precursor, such as titanium butoxide, a monomer containing a reactive functional group for subsequent infusion processes (such as acrylic acid), and/or high refractive index nanoparticles (e.g., $ZrO_2$, $TiO_2$, GaP, $HfO_2$, GaAs, etc.). The NIL resin layer 304 may be deposited on the substrate 302 by, for example, spin-coating, lamination, or ink injection. A NIL mold 306 with triangular slanted grooves 308 may be pressed against the NIL resin layer 304, as shown by a downward facing arrow 310. The resin layer 304 may fill the triangular grooves 308 by capillary force. Pressure may be applied to facilitate the filling process. The resin may be may be subsequently cured or cross-linked e.g. by using heat and/or ultraviolet (UV) light. Then, the NIL mold 306 may be lifted as shown by an upward facing arrow 314 (FIG. 3B), forming the array of ridges 312 extending from the substrate 302. The ridges 312 run parallel to one another in a plane parallel to the plane of the substrate 302 (perpendicular to the plane of FIGS. 3A and 3B) and have triangular cross-sections formed by first 321 and second 322 sides. Such a configuration is sometimes referred to as a blazed grating configuration. The first sides 321 of the ridges 312 face in a first direction 331 represented by a normal to the first sides 321, and second sides 322, adjacent respective first sides 321 of the ridges 312 face in a second, different direction 332 represented by a normal to the second sides 322. A slight undercut 316 of the second sides 322, that is, a negative slope or overhang of the second sides 322, may be formed e.g. by providing a corresponding complementary shape of the triangular slanted grooves 308. The purpose of the undercut 316 will be explained further below.

Figure 3C:
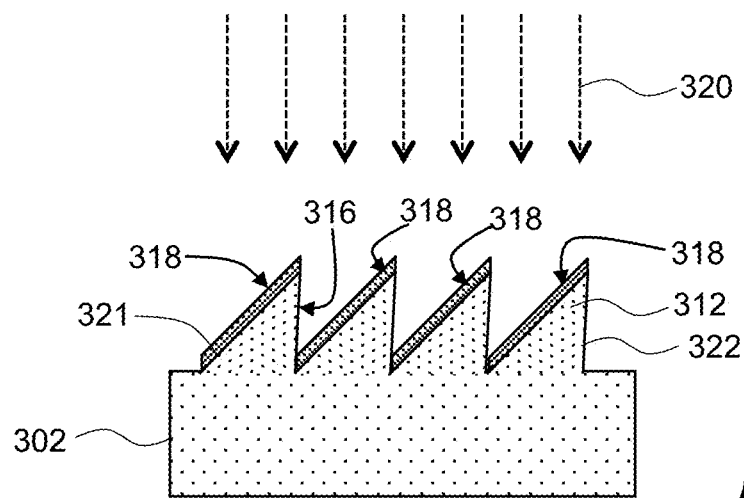

Referring to FIG. 3C, an array of grating lines 318 may be formed on the first sides 321 of the array of ridges 312. Each grating line 318 includes a slab of transparent material supported by the first side 321 of a corresponding ridge 312 of the array of ridges. The material of the grating lines 318 may include e.g. silicon nitride ($Si_3N_4$), silicon oxide ($SiO_2$), silicon oxynitride, siliconoxycarbonitride, a metal oxide, etc. The refractive index of the array of grating lines 318 is different from the refractive index of the array of ridges 312. In most embodiments, the material of the array of grating lines 318 is different from the material of the array of ridges 312.

The grating lines 318 may be formed using a suitable directional deposition technique which leaves the first sides 321 of the array of ridges 312 coated, while leaving the second sides 322 uncoated, i.e. such that no grating lines are present on the second sides 322 of the ridges 312. The directional deposition is illustrated with vertical down-facing arrows 320. The directional deposition techniques may include, for example, Plasma Enhanced Chemical Vapor Deposition (PECVD), thermal evaporation, electron beam evaporation, sputtering, or any other method of deposition of the grating layer material selectively on the first sides 321 of the array of ridges 312. The undercut 316 facilitates formation of the grating lines 318 only on the first sides 321 of the ridges 312, because the undercut 316 shadows the second sides 322 from the material of the grating lines 318 being deposited on the first sides 321 of the ridges 312.

The array of grating lines 318 may also be formed by isotropic deposition of a grating layer material using, for example, chemical vapor deposition (CVD), atomic layer deposition (ALD), or similar techniques. The grating layer material may be deposited over the first 321 and second 322 sides of the ridges 312, and may be followed by an anisotropic etching (e.g. ion milling, reactive ion beam etching, gas cluster ion beam, etc.) of the grating layer material from the second sides 322 of the ridges 312. The anisotropic etching may be performed at an angle that effectively shadows or protects the grating lines 318 on the first sides 321 of the ridges 312, while removing the grating material from the second sides 322. In some embodiments, the anisotropic deposition and/or anisotropic etching is spatially variant to produce diffraction gratings having spatially varying properties. These are frequently used in pupil-replicating waveguides to achieve a more uniform distribution of optical power density of the displayed image across the replicated pupil.

Figure 3D:
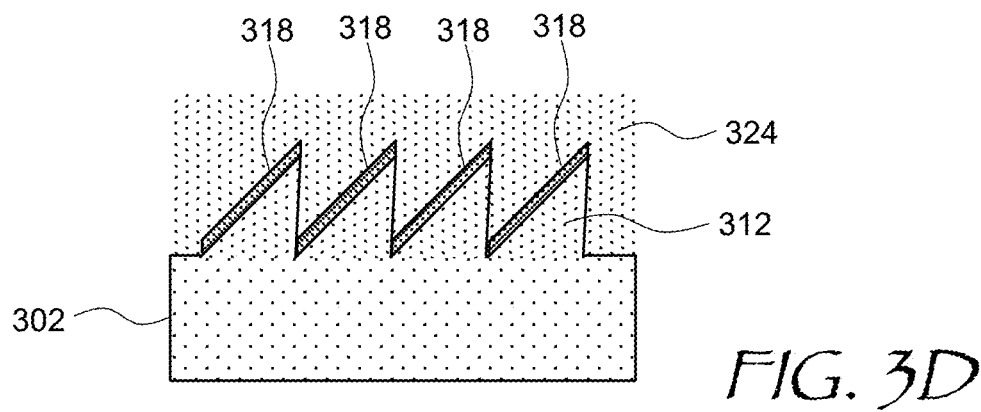

Turning to FIG. 3D, the array of grating lines 318 may be over-coated with an overcoat layer 324 of material having a refractive index different from the material of the grating lines 318. For example, in some embodiments, a high refractive index material, such as Hafnia, Titania, Tungsten oxide, Zirconium oxide, Gallium sulfide, Gallium nitride, Gallium phosphide, silicon, a high refractive index polymer, or a combination of the above materials may be used to over-coat the array of grating lines 318 and fill the gaps between the grating lines 318. In some embodiments, a low refractive index material, such as silicon oxide, alumina, porous silica, or fluorinated low index monomer (or polymer), may be used to over-coat the slanted grating and fill the gaps between the grating lines 318. The overcoat layer 324 may have a substantially flat top surface 326 opposite the substrate 302.

Figure 3E:
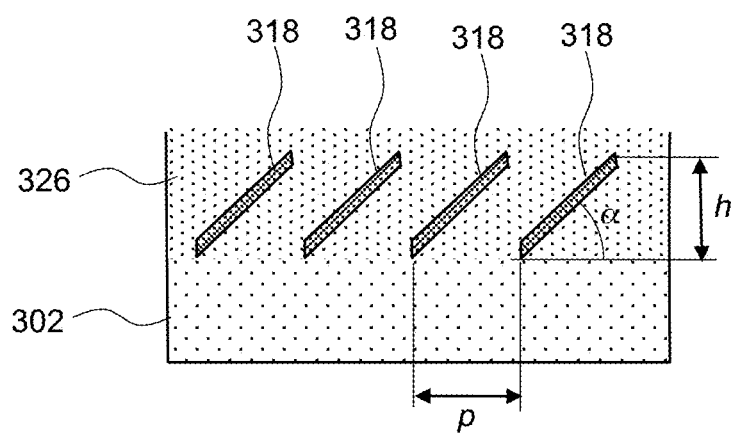

In some embodiments, the overcoat layer 324 has a refractive index close to a refractive index of the array of ridges 312. When the difference between the indices of refraction of the overcoat layer 324 and the array of ridges 312 is small enough, e.g. less than 0.05, the ridges 312 may "disappear" optically, becoming nearly invisible in the display light. When the overcoat layer 324 has a same refractive index e.g. is formed of a same material as the array of ridges 312, the latter become indistinguishable from the overcoat layer 324, resulting in the grating lines 318 suspended in a uniform transparent supporting matrix 326, as shown in FIG. 3E. The transparent matrix 326 supports the array of grating lines 318 over the substrate 302, such that each grating line 318 is disposed at the tilt angle α to the substrate.

The "line-of-sight" vertical deposition illustrated with vertical down-facing arrows 320 in FIG. 3C results in a relationship between the pitch p, the tilt angle α, and the height h of the grating lines 318 (FIG. 3E), specifically $$h = p \tan \alpha \quad (1)$$

In some embodiments, the deposition may be performed not vertically but at an acute angle to the substrate 302, such that the relationship (1) no longer applies. The angle of directional deposition of a grating layer may be coordinated with angles of the sides of triangular ridges supporting the grating lines. By way of a non-limiting example, referring to FIG. 4A, an array of ridges 412A on a substrate 402 may be manufactured using slanted etching or molding techniques described above. The ridges 412A have a triangular cross-section formed by first 421 and second 422 sides, with no undercut or overhang of either of the first 421 and second 422 sides. Grating lines 418A may be deposited using slanted directional deposition at a deposition angle represented by arrows 420A. At this deposition angle, the second sides 422 of the ridges 412 are shielded by the first sides 421 of the ridges 412, even though there is no undercut present in the ridges 412A. Not only the second sides 422 may be shielded, but also portions of the first sides 421, as well. For example, in FIG. 4A, portions 429 of the first sides 421 are left uncoated by the grating lines 418A material. As a result, each slab of the array of grating lines 418A covers only a portion of a corresponding first side 421 of the array of ridges 412A.

The material of the grating lines 418A may include e.g. $Si_3N_4$, $SiO_2$, silicon oxynitride, siliconoxycarbonitride, a metal oxide, etc. The refractive index of the array of grating lines 418A is different from the refractive index of the array of ridges 412, which may be achieved by having the material of the array of grating lines 418A different from the material of the array of ridges 412.

The grating lines 418A may be formed using a suitable directional deposition technique such as PECVD, thermal evaporation, electron beam evaporation, sputtering, or any other method of deposition of the grating layer material selectively on the first sides 421 and not on the second sides 422 of the array of ridges 412A. The array of grating lines 418A may also be formed by isotropic deposition of a grating layer material using, for example, CVD, ALD, or similar techniques. The grating layer material may be deposited over the first 421 and second 422 sides of the ridges 412A, followed by an anisotropic etching, e.g. ion milling, reactive ion beam etching, gas cluster ion beam, etc., of the grating layer material from the second sides 422 of the ridges 412A. The anisotropic etching may be performed at an angle that effectively shadows or protects the grating lines 418A on the first sides 421 of the ridges 412, while removing the grating material from the second sides 422. In some embodiments, the anisotropic deposition and/or anisotropic etching is spatially variant to produce diffraction gratings having spatially varying properties.

An advantage brought by using an off-axis deposition, or anisotropic etching for that matter, is that the height h of the grating 418A supported by the ridges 412A and optionally suspended in a uniform matrix 426 can be adjusted independently of the tilt angle α and pitch p of the grating lines 418A supported by the first sides 421 of the array of ridges 412A, such that the relationship (1), valid for perpendicular depositions considered in FIGS. 3A to 3E, no longer applies. In the diffraction grating of FIG. 4A, the height h of the suspended diffraction grating lines 418A can also be lower than the height of the ridges 412A due to the partial shielding leaving the portions 429 of the first sides 421 uncoated by the grating line material.

Figure 4A:
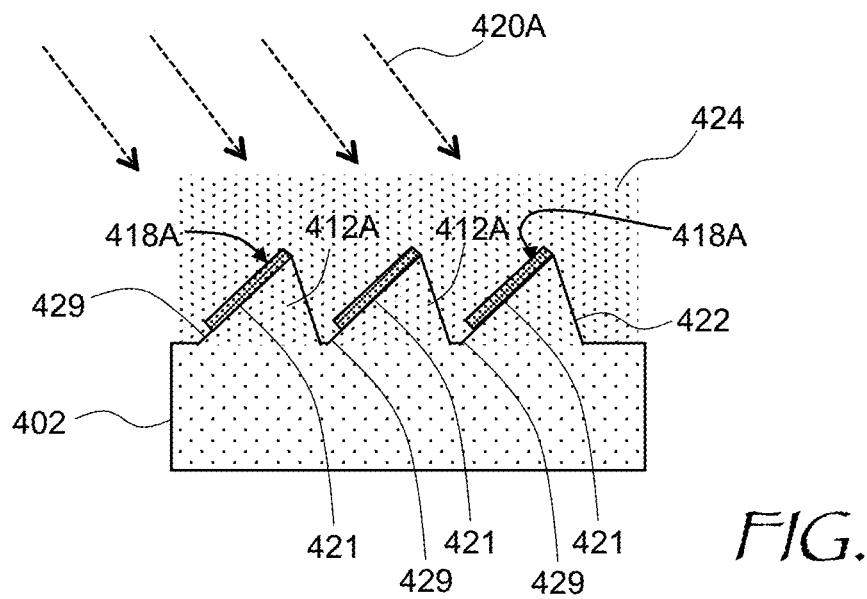
FIGS. 4A and 4B are schematic side cross-sectional views of diffraction gratings of the present disclosure manufactured using angled directional deposition of the grating lines.
Figure 4B:
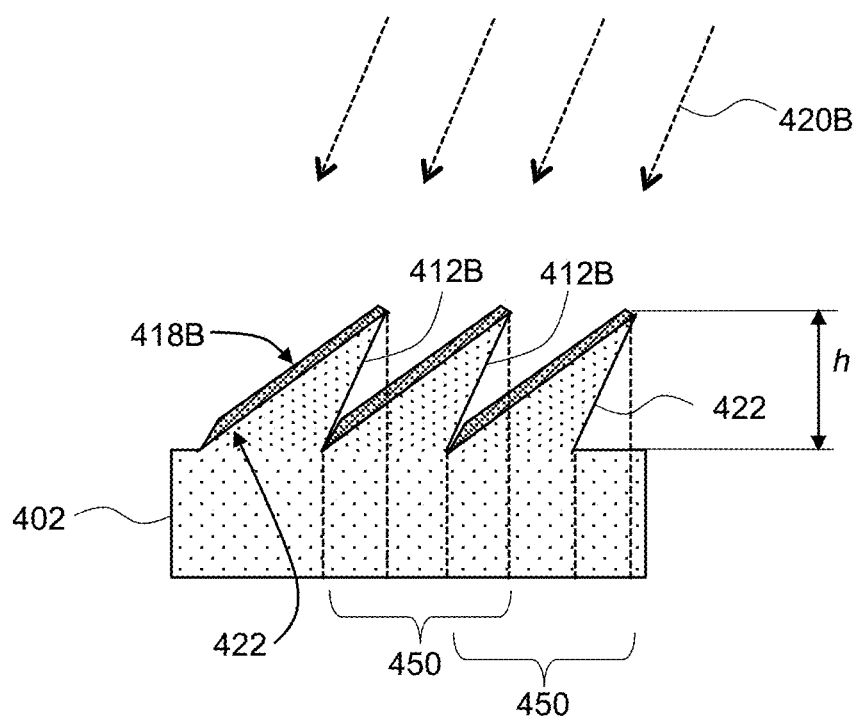

Turning to FIG. 4B, overhung ridges 412B present some interesting possibilities, e.g. they may allow manufacturing of overhang of grating lines 418B. The overhung ridges 412B may be manufactured using slanted etching or molding techniques described above using an appropriately shaped mold. Directional deposition of grating lines 418B such as e.g. PECVD, thermal evaporation, electron beam evaporation, sputtering, is performed in a direction represented by arrows 420B, such that the grating lines 418B are deposited on the first sides 421 of the overhung ridges 412B but not on the second sides of the overhung ridges 412B, because the second sides are shielded by the overhung ridges 412B. Projections 450 of neighboring grating lines 418B onto the substrate 402 overlap each other.

Similarly to FIG. 4A, the array of grating lines 418B of FIG. 4B may be formed by isotropic deposition of a grating layer material using, for example, CVD, ALD, or similar techniques. The grating layer material is deposited over both the first 421 and second 422 sides of the ridges 412A. This is followed by an anisotropic etching of the grating layer material from the second sides 422 of the ridges 412B. The anisotropic etching may be performed at an angle that effectively shadows or protects the grating lines 418B on the first sides 421 of the ridges 412, while removing the grating material from the second sides 422. Using this strategy, one can achieve the height h of the suspended grating 418B taller than the height h defined by relationship (1) above. The extra flexibility offered by off-axis deposition may enable a wider range of possibilities to optimize the diffraction of the grating and reduce rainbow artifacts.

Figure 5A:
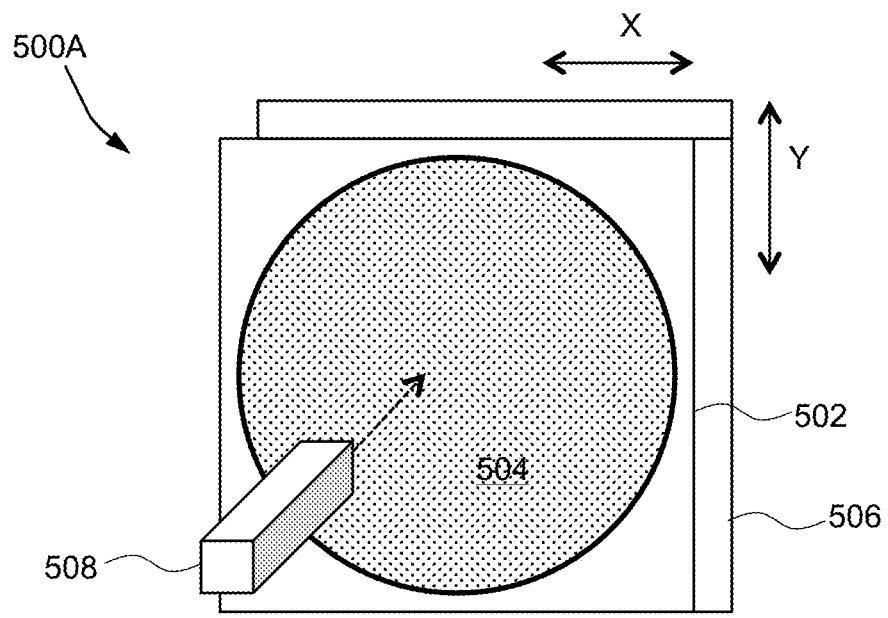
FIG. 5A is a top view of an apparatus for selectively removing portions of the grating line material.

In some embodiments, the anisotropic deposition and/or anisotropic etching is performed in a spatially variant manner to produce diffraction gratings having spatially varying properties such as duty cycle k, for example. Referring to FIG. 5A, an apparatus 500A for selectively removing portions of the grating line material may include a wafer holder 502 for holding a grating wafer 504. The wafer holder 502 may be mounted on an XY translational stage 506 for translating the grating wafer 504 in X and Y directions, as shown. A selective material remover head, e.g. a gas cluster ion beam tool 508, is disposed over the grating wafer 504. In operation, the gas cluster ion beam tool 508 provides a focused beam of gas clusters, e.g. Argon gas clusters, at a pre-defined fixed or variable angle of incidence. The gas clusters bombard a top surface of the grating wafer 504 to selectively remove a material, e.g. the transparent material of the grating grooves, in a controllable manner. The XY translational stage 506 can be controlled to scan the grating wafer 504 in X and Y directions. The amount of the material being removed by the gas cluster ion beam tool 508 may be controlled by setting at least one of the removal time, the ion beam intensity, etc., as the grating wafer 504 is scanned in X and Y directions. In this manner, arrays of grating lines having a spatially varying duty cycle k may be produced. It is to be noted that thickness of any layer of a diffraction grating can be varied this way; for varying the duty cycle k, the step of selective material removal may be performed after the step of forming the grating layer.

Figure 5B:
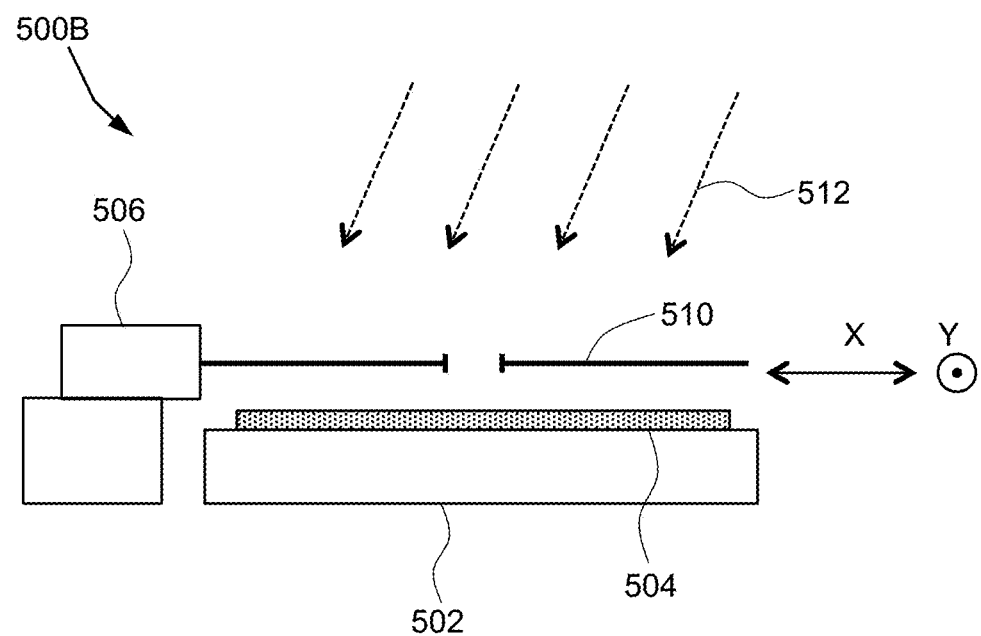
FIG. 5B is a side view of an apparatus for space-variant selective deposition of the grating line material.

Turning to FIG. 5B, an apparatus 500B for space-variant selective deposition of the grating line material may include the wafer holder 502 for holding the grating wafer 504. An aperture 510 may be disposed over the grating wafer 504. The aperture 510 may be mounted on the XY translational state 506. In operation, a sputtering beam 512 is directed at a pre-defined fixed or variable angle towards the grating wafer 504 through the aperture 510. The XY translational stage 506 can be controlled to scan the aperture 510 in X and Y directions. The amount of the material being deposited by the sputtering beam 512 may be controlled by setting at least one of the deposition time, the sputtering beam power, etc., as the aperture 510 is scanned in X and Y directions. In this manner, arrays of grating lines having a spatially varying duty cycle k may be produced. It is to be noted that thickness of any layer of a diffraction grating can be varied this way; for varying the duty cycle k, the step of directional material deposition may be performed immediately after the step of forming the array of triangular (blazed) ridges. It is further noted that the apparatuses 500A and 500B of FIGS. 5A and 5B are only examples; the element being translated (i.e. the beams translated relative to wafers, the wafers translated relative to beams) and the deposition/removal methods may vary.

Diffraction grating devices disclosed herein may be used as pupil-replicating waveguides, e.g. by manufacturing the diffraction gratings on a substrate capable of guiding light. One such pupil-replicating waveguide 600 is shown schematically in FIG. 6. The thicknesses of diffraction grating layers are exaggerated for clarity. A substrate 602 of the pupil-replicating waveguide 600 has opposed first 641 and second 642 surfaces. An array of ridges 612, corresponding to the ridges 312 of FIGS. 3B to 3D and the ridges 412 of FIGS. 4A and 4B, extends from the first surface 641. The substrate 602 is configured to guide display light 605 emitted by a light source 604, e.g. a projection display, by total internal refection (TIR) from the second surface 642 and a top surface 662 of an overcoat layer 624 corresponding to the overcoat layer 324 of FIGS. 3D and 3E. An array of diffraction grating lines 618 is formed similarly as the diffraction grating lines 318 of FIGS. 3C to 3E. At least one of pitch, duty cycle, or refractive index of the array of grating lines 618 can be selected to output the portions 655 of the display light 605 at a plurality of offset locations along an optical path of the display light 605. Furthermore, at least one of the pitch, the duty cycle, or the aspect ratio of the array of grating lines 618 may be selected to reduce non-zero-order diffraction of external light generally in a same direction as the display light portions 655. In some embodiments involving operation with visible light, the pitch of a diffraction grating is between 150 nm and 600 nm. Some optimizations for reduction of rainbow effects may require pitch less than 0.3, e.g. 0.01 to 0.3, and greater than 0.7, e.g. 0.7 to 0.99. The tilt angle, measured from a normal to the substrate, e.g. as shown in FIG. 2, is commonly about 60 degrees, but it may also be larger than 60 degrees, e.g. 60 to 80 degrees, or smaller than 60 degrees, e.g. 30 to 60 degrees.

It is to be understood that the diffraction grating device structures and methods of manufacture described herein may be applicable not only to rainbow effects reduction in pupil-replicating waveguides, but in any other optimization of pupil-replicating waveguides, other types of waveguides, and more generally other types of devices and applications in which diffraction gratings may be used to disperse or redirect light.

Figure 6:
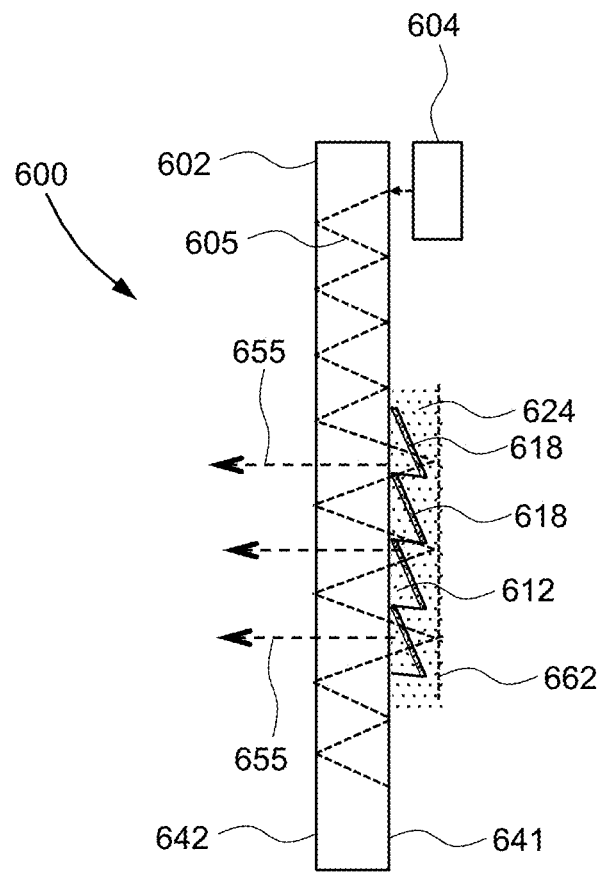
FIG. 6 is a schematic side cross-sectional view of a pupil-replicating waveguide based on a diffraction grating of the present disclosure.
Figure 7:
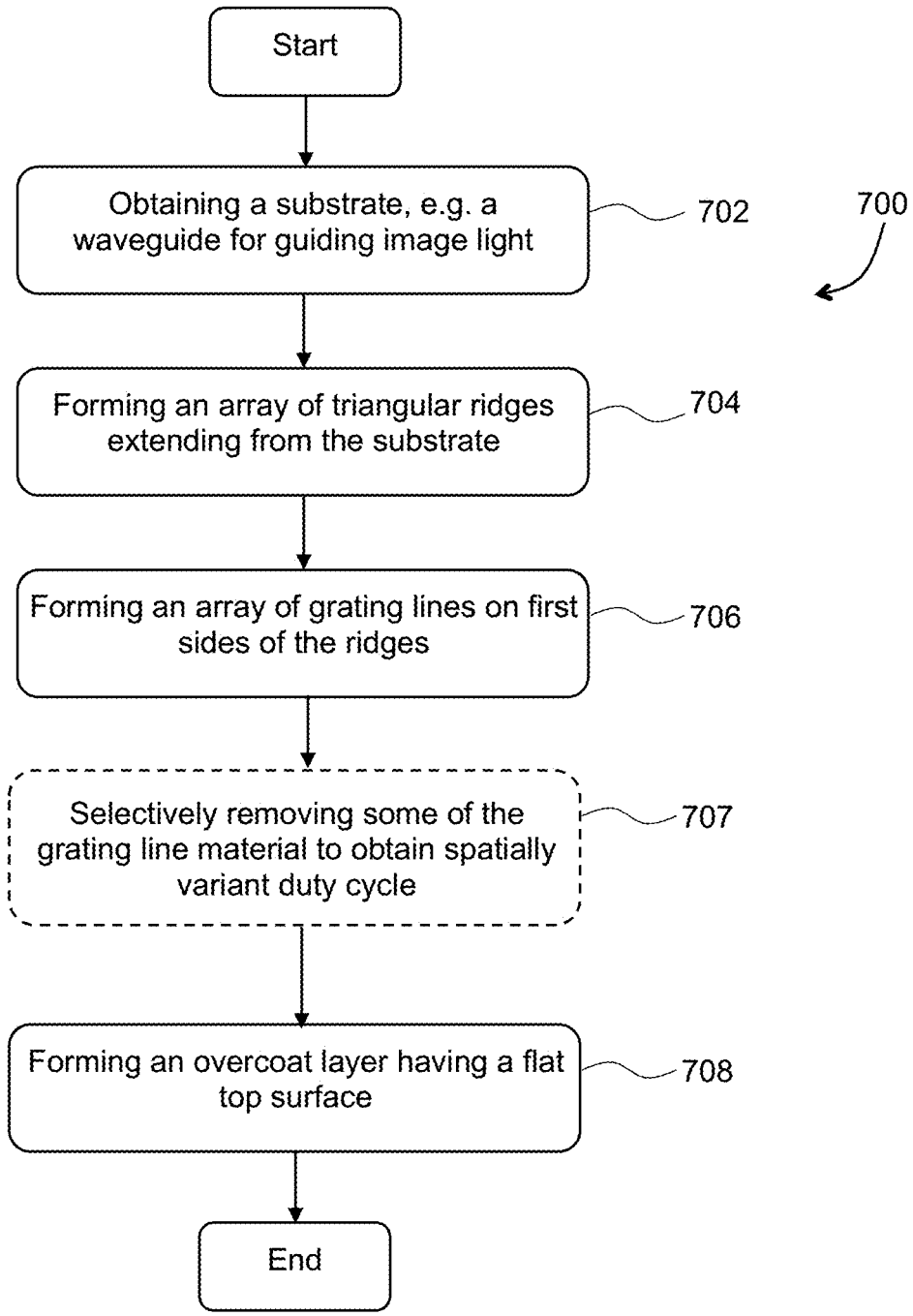
FIG. 7 is a flow chart of a method of manufacture a diffraction grating according to the present disclosure.

Turning to FIG. 7, a method 700 of manufacturing a diffraction grating of present disclosure may include obtaining (702) a substrate for the diffraction grating, e.g. a waveguide substrate of an image-replicating waveguide for guiding display light from a light source to a user's eye, i.e. like the waveguide 600 of FIG. 6. An array of triangular ridges extending from the substrate may be formed (FIG. 7; 704) using NIL techniques. To that end, an NIL resin layer e.g. a butyl-acrylate based resin doped with a resin comprising a sol-gel precursor, such as titanium butoxide, a monomer containing a reactive functional group for subsequent infusion processes (such as acrylic acid), and/or high refractive index nanoparticles (e.g., $TiO_2$, GaP, $HfO_2$, GaAs, etc.), is deposited on the substrate by, for example, spin-coating, lamination, or ink injection. A NIL mold, which may be manufactured using e.g. directional etching and/or directional deposition techniques, or molded itself from a master mold, may then be pressed into the NIL resin layer, which is subsequently cured, e.g. UV-cured or heat-cured. The NIL mold may then be lifted. It is noted that the release of the triangular or blazed NIL mold (i.e. having a triangular cross-section of the grooves) is much easier than demolding slanted slab structures having rhomboidal or slab cross-section. The amount of stress imparted to the imprinted lines—even for partially overhanging triangular (blazed grating) structures—is considerably lower than for slanted plano-parallel lines with e.g. 60 degree slant. Lower demolding stress results in a much lower probability of structural failures such as line tear out, mold breakage, low pattern fidelity, etc. This may open a new design space, may extend fabrication process windows and is expected to increase throughput and yield of the manufacturing process relative to imprinting/etching slanted gratings having rectangular/rhomboidal cross-sections.

The formed ridges run parallel to one another in a plane of the substrate, or in a parallel plane. The formed ridges do not need to remain straight throughout the length of the substrate, i.e. they may make turns as required by the grating design. The ridges have triangular cross-sections, such that at each location on the substrate, first sides of the ridges face in a first direction and adjacent second sides of the ridges face in a second, different direction.

An array of grating lines is formed (706) over the first sides of the array of ridges. Each grating line of the array of grating lines includes a slab of transparent material supported by the first side of a corresponding ridge of the array of ridges. A refractive index of the array of grating lines is different from a refractive index of the array of ridges; the material of the grating lines may include e.g. silicon nitride ($Si_3N_4$), silicon oxide ($SiO_2$), silicon oxynitride, siliconoxy-carbonitride, a metal oxide, etc. The grating lines may be formed using a suitable directional deposition technique including, for example, PECVD, thermal evaporation, electron beam evaporation, sputtering, or any other method of deposition of the grating layer material selectively on the first sides of the array of ridges.

The array of grating lines may also be formed by isotropic deposition of a grating layer material using, for example, CVD, ALD, or similar techniques. The grating layer material may be deposited over both sides of the ridges, and is followed by an anisotropic etching (e.g. ion milling, reactive ion beam etching, gas cluster ion beam etching) of the grating layer material from the second sides. The directional etching step may be performed using, for example, an ion beam etching (IBE) tool with capabilities to rotate the mold material layer with respect to the direction of the ion beam, or a gas cluster ion rastering beam to provide etch spatial control. After the etching, no grating lines are present on the second sides of the ridges.

The grating duty cycle may be then adjusted (707) using space-variant selective material removal techniques such as the ones described above with reference to FIG. 5A. Alternatively or in addition, the step 706 of forming the array of grating lines may be performed in a space-variant manner, as described above with reference to FIG. 5B.

The array of grating lines may then be coated (708) with an overcoat layer of material having a refractive index different from the material of the grating lines. A high refractive index material, such as Hafnia, Titania, Tungsten oxide, Zirconium oxide, Gallium sulfide, Gallium nitride, Gallium phosphide, silicon, or a high refractive index polymer, may be used. In some embodiments, a low refractive index material, such as silicon oxide, alumina, porous silica, or fluorinated low index monomer (or polymer), or any combination of the above materials may be used. The overcoat layer has a substantially flat top surface opposite the substrate. In some embodiments, the overcoat layer has a refractive index close to the refractive index of the array of ridges, which can make the ridges become nearly invisible to the display light. Details of the steps 702 to 708 are also provided above with reference to FIGS. 3A to 3E, FIGS. 4A, 4B, and FIGS. 5A, 5B.

It is to be noted that FIG. 7 is a simplified flow chart 700 illustrating example methods of fabrication of a diffraction grating. Even though FIG. 7 describes the operations as a sequential process, some of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block.

Figure 8A:
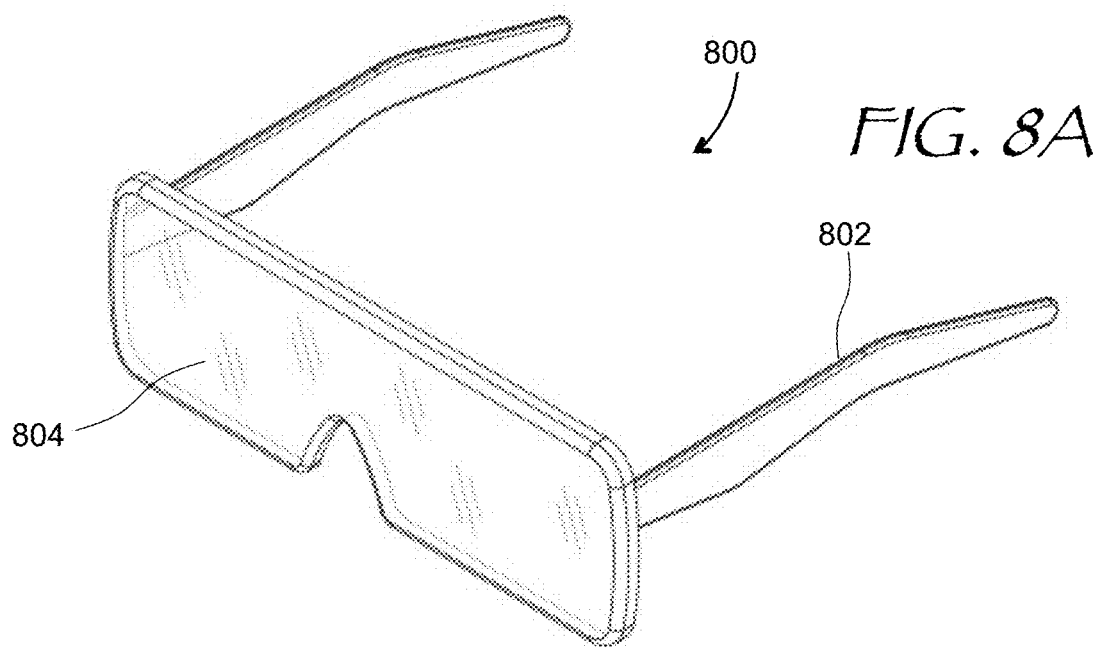
FIG. 8A is an isometric view of an eyeglasses form factor near-eye augmented reality (AR)/virtual reality (VR) display incorporating a diffraction grating and a pupil-replicating waveguide of the present disclosure.
Figure 8B:
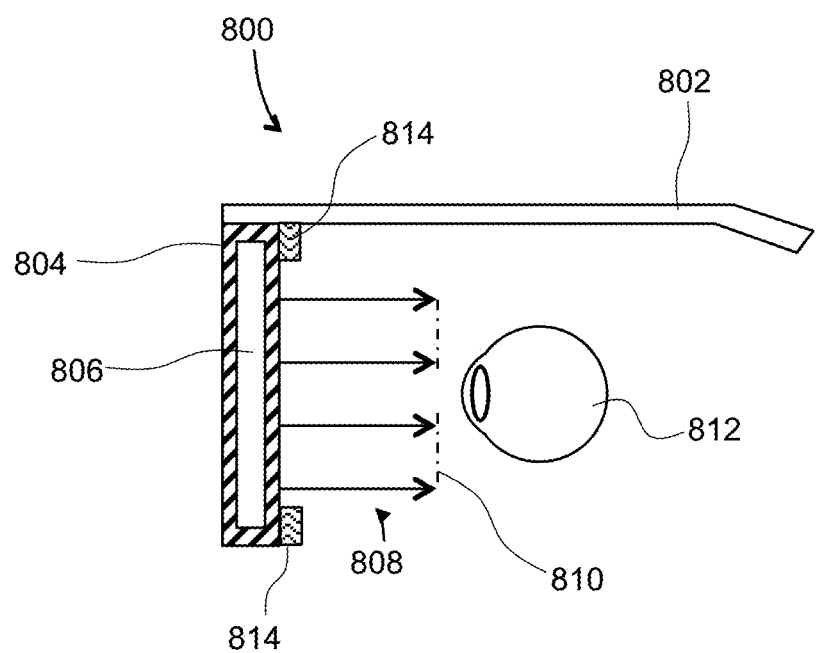
FIG. 8B is a side cross-sectional view of the AR/VR display of FIG. 8A.

Referring to FIGS. 8A and 8B, a near-eye AR/VR display 800 may include the diffraction grating 200 of FIG. 2, the pupil-replicating waveguide 600 of FIG. 6, or a pupil-replicating waveguide incorporating any of diffraction gratings described herein. A body or frame 802 of the near-eye AR/VR display 800 has a form factor of a pair of eyeglasses. A display 804 includes a display assembly 806 (FIG. 8B), which provides display light 808 to an eyebox 810, i.e. a geometrical area where a good-quality image may be presented to a user's eye 812. The display assembly 806 may include a separate coherent-replication AR/VR display module for each eye, or one coherent-replication AR/VR display module for both eyes. For the latter case, an optical switching device may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery.

An electronic display of the display assembly 806 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 800 may also include an eye-tracking system 814 for determining, in real time, the gaze direction and/or the vergence angle of the user's eyes 812. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Yet furthermore, the near-eye coherent AR/VR display 800 may include an audio system, such as small speakers or headphones.

Figure 9:
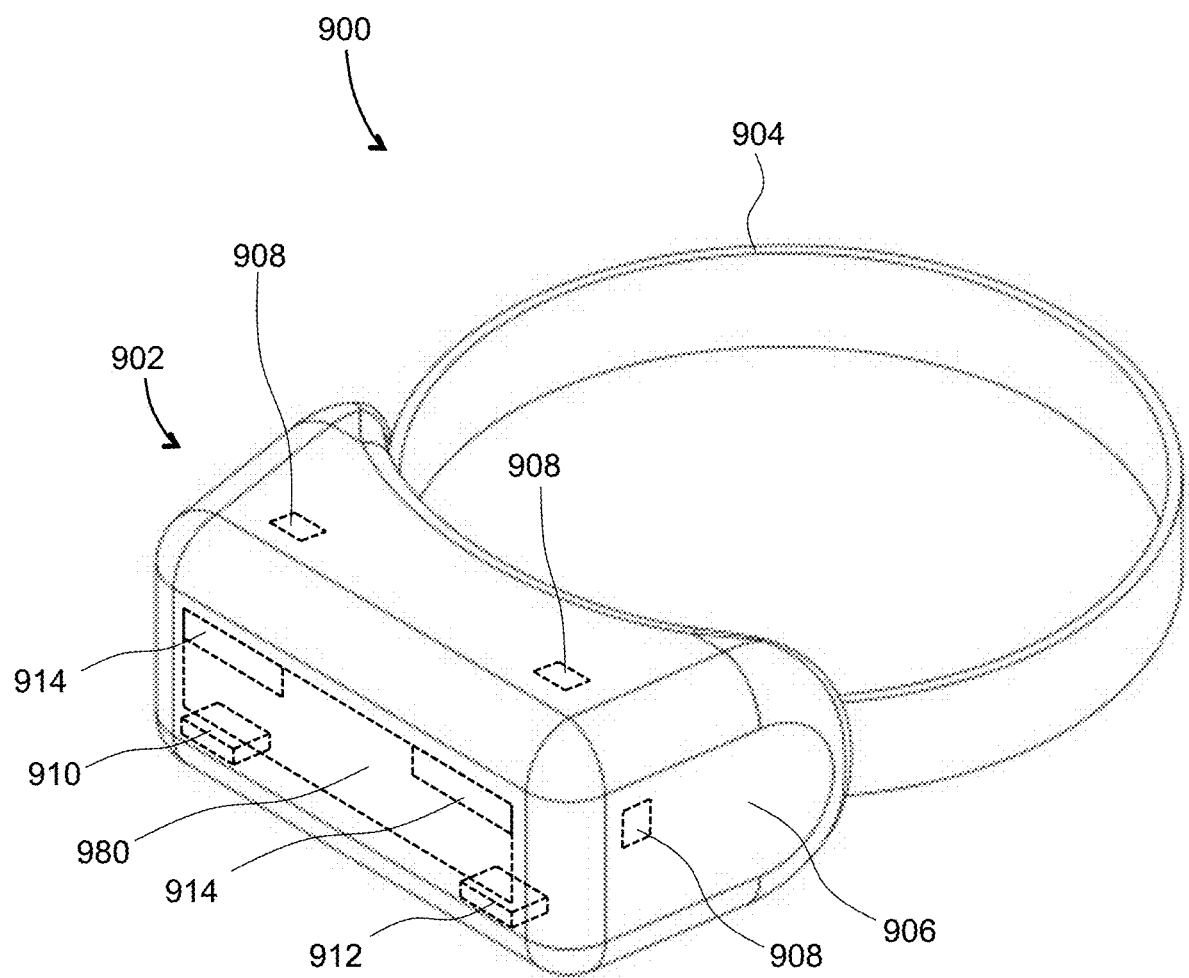
FIG. 9 is an isometric view of a head-mounted display (HMD) incorporating a diffraction grating and a pupil-replicating waveguide of the present disclosure.

Turning to FIG. 9, an HMD 900 is an example of an AR/VR wearable display system enclosing user's eyes for a greater degree of immersion into the AR/VR environment. The HMD 900 may be a part of an AR/VR system including a user position and orientation tracking system, an external camera, a gesture recognition system, control means for providing user input and controls to the system, and a central console for storing software programs and other data for interacting with the user for interacting with the AR/VR environment. The functional purpose of the HMD 900 is to augment views of a physical, real-world environment with computer-generated imagery, and/or to generate entirely virtual 3D imagery. The HMD 900 may include a front body 902 and a band 904. The front body 902 is configured for placement in front of eyes of the user in a reliable and comfortable manner, and the band 904 may be stretched to secure the front body 902 on the user's head. A display system 980 may include any of the waveguide assemblies described herein. The display system 980 may be disposed in the front body 902 for presenting AR/VR images to the user. Sides 906 of the front body 902 may be opaque or transparent.

In some embodiments, the front body 902 includes locators 908, an inertial measurement unit (IMU) 910 for tracking acceleration of the HMD 900 in real time, and position sensors 912 for tracking position of the HMD 900 in real time. The locators 908 may be traced by an external imaging device of a virtual reality system, such that the virtual reality system can track the location and orientation of the HMD 900 in real time. Information generated by the IMU and the position sensors 912 may be compared with the position and orientation obtained by tracking the locators 908, for improved tracking of position and orientation of the HMD 900. Accurate position and orientation is important for presenting appropriate virtual scenery to the user as the latter moves and turns in 3D space.

The HMD 900 may further include an eye tracking system 914, which determines orientation and position of user's eyes in real time. The obtained position and orientation of the eyes allows the HMD 900 to determine the gaze direction of the user and to adjust the image generated by the display system 980 accordingly. In one embodiment, the vergence, that is, the convergence angle of the user's eyes gaze, is determined. The determined gaze direction and vergence angle may be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of manufacturing a diffraction grating, the method comprising:
    forming an array of ridges extending from a substrate, the ridges running parallel to one another and having triangular cross-sections, such that first sides of the ridges face in a first direction and adjacent second sides of the ridges face in a second, different direction;
    forming an array of grating lines over the first sides of the array of ridges, each grating line of the array of grating lines comprising a slab of transparent material supported by the first side of a corresponding ridge of the array of ridges;
    forming an overcoat layer over the array of grating lines, the overcoat layer having a substantially flat top surface opposite the substrate; and
    wherein a refractive index of the array of grating lines is different from a refractive index of the array of ridges.

2. The method of claim 1, wherein the array of ridges is formed in a nanoimprint lithography (NIL) process from a resin layer.

3. The method of claim 2, wherein the resin layer comprises at least one of: butyl-acrylate based resin doped with a resin comprising a sol-gel precursor; a monomer comprising a reactive functional group; or nanoparticles comprising at least one of $ZrO_2$, $TiO_2$, GaP, $HfO_2$, or GaAs.

4. The method of claim 2, wherein the NIL process comprises:
    depositing the resin layer on the substrate;
    applying a NIL mold against the resin layer, the NIL mold comprising an array of triangular slanted grooves; and
    lifting the NIL mold.

5. The method of claim 1, wherein the slabs of the grating lines form an angle with the substrate of equal to or less than 30 degrees.

6. The method of claim 1, wherein the overcoat layer is formed of a same material as the array of ridges, forming a transparent matrix supporting the array of grating lines over the substrate, such that each grating line of the array of grating lines is disposed at an acute angle to the substrate.

7. The method of claim 1, wherein a difference between a refractive index of the overcoat layer and a refractive index of the array of ridges is less than 0.05.

8. The method of claim 1, wherein the substrate comprises a waveguide for guiding light therein.

9. The method of claim 1, wherein at least one of the substrate or the array of ridges comprises a different material than the array of grating lines.

10. The method of claim 1, wherein each grating line slab of the array of grating lines covers only a portion of a corresponding first side of the array of ridges.

11. A method of manufacturing a diffraction grating, the method comprising:
    forming an array of ridges extending from a substrate, the ridges running parallel to one another and having triangular cross-sections, such that first sides of the ridges face in a first direction and adjacent second sides of the ridges face in a second, different direction; and
    forming an array of grating lines over the first sides of the array of ridges, each grating line of the array of grating lines comprising a slab of transparent material supported by the first side of a corresponding ridge of the array of ridges;
    wherein the array of grating lines is formed such that no grating lines are present on the second sides of the ridges; and
    wherein the array of grating lines is formed using a directional deposition of a grating layer material over the first sides of the array of ridges.

12. The method of claim 11, wherein the directional deposition of a grating layer material is spatially variant to produce the array of grating lines having a spatially variant duty cycle.

13. The method of claim 11, wherein the array of grating lines is formed by isotropic deposition of a grating layer material over the first and second sides of the ridges, followed by an anisotropic etching of the grating layer material from the second sides of the ridges.

14. The method of claim 13, wherein the anisotropic etching of the grating layer material further comprises spatially variant etching of the grating layer material from the first sides of the ridges to produce the array of grating lines having a spatially variant duty cycle.

15. A method of manufacturing a diffraction grating, the method comprising:
    forming an array of ridges extending from a substrate, the ridges running parallel to one another and having triangular cross-sections, such that first sides of the ridges face in a first direction and adjacent second sides of the ridges face in a second, different direction; and
    forming an array of grating lines over the first sides of the array of ridges, each grating line of the array of grating lines comprising a slab of transparent material supported by the first side of a corresponding ridge of the array of ridges;
wherein vertical projections of neighboring grating lines of the array of grating lines onto the substrate overlap each other.

* * * * *